(12) United States Patent
Soares

(10) Patent No.: US 12,255,569 B2
(45) Date of Patent: Mar. 18, 2025

(54) BRAKING METHODS

(71) Applicant: NIDEC GLOBAL APPLIANCE BRASIL LTDA., Joinville (BR)

(72) Inventor: Claudio Eduardo Soares, Joinville (BR)

(73) Assignee: NIDEC GLOBAL APPLIANCE BRASIL LTDA., Joinville (BR)

( * ) Notice: Subject to any disclaimer, the term of this patent is extended or adjusted under 35 U.S.C. 154(b) by 112 days.

(21) Appl. No.: 18/038,676

(22) PCT Filed: Nov. 23, 2021

(86) PCT No.: PCT/BR2021/050512
§ 371 (c)(1),
(2) Date: May 24, 2023

(87) PCT Pub. No.: WO2022/109702
PCT Pub. Date: Jun. 2, 2022

(65) Prior Publication Data
US 2024/0039433 A1    Feb. 1, 2024

(30) Foreign Application Priority Data
Nov. 25, 2020 (BR) ............ 10 2020 024064 1

(51) Int. Cl.
| | |
|---|---|
| H02P 3/22 | (2006.01) |
| H02P 6/182 | (2016.01) |
| H02P 6/24 | (2006.01) |

(52) U.S. Cl.
CPC ............... *H02P 3/22* (2013.01); *H02P 6/182* (2013.01); *H02P 6/24* (2013.01)

(58) Field of Classification Search
CPC .. H02P 6/16; H02P 25/03; H02P 6/182; H02P 3/22; H02P 6/24
See application file for complete search history.

(56) References Cited

U.S. PATENT DOCUMENTS

| | | | |
|---|---|---|---|
| 6,512,341 B2 | 1/2003 | Matsushiro et al. | |
| 6,838,840 B1 * | 1/2005 | Dainez | H02P 6/12 |
| | | | 318/400.21 |

(Continued)

FOREIGN PATENT DOCUMENTS

| | | |
|---|---|---|
| BR | PI0004062-2 B1 | 10/2015 |
| EP | 2 665 177 A2 | 11/2013 |
| EP | 3 611 837 A1 | 2/2020 |

OTHER PUBLICATIONS

International Search Report dated Feb. 2, 2022 issued in International Application No. PCT/BR2021/050512, 3 pages.

(Continued)

*Primary Examiner* — Thai T Dinh
(74) *Attorney, Agent, or Firm* — FOLEY & LARDNER LLP

(57) ABSTRACT

This invention refers to a rheostatic braking method, applied on a BLDC motor (10) used in hermetic compressors, comprising:
selecting a first phase and a second phase, connected to the BLDC motor (10), which will be short-circuited, at a certain electric position of the BLDC motor (10), wherein the first phase and the second phase selected are the phases having the major induced voltage and the minor induced voltage at a certain electric position of the BLDC motor (10);
maintaining a third open phase to monitor the electric position of the BLDC motor (10) by means of monitoring the induced voltage at this third open phase; and
separating the rheostatic braking in six electric positions, each electric position being associated to two electric sections: a first section before zero crossing of the induced voltage of the third open phase; and a second section after the zero crossing.

15 Claims, 13 Drawing Sheets

(56) References Cited

U.S. PATENT DOCUMENTS

| | | | |
|---|---|---|---|
| 6,922,027 B2 | 7/2005 | Schwarz et al. | |
| 8,643,320 B2 * | 2/2014 | Soares | H02P 23/0004 |
| | | | 700/170 |
| 9,160,263 B2 * | 10/2015 | Jeske | H02P 6/182 |
| 10,965,227 B2 * | 3/2021 | Benarous | H02P 3/22 |
| 11,133,760 B2 * | 9/2021 | Ji | H02P 3/22 |
| 2020/0186057 A1 | 6/2020 | Ji et al. | |

OTHER PUBLICATIONS

Lai, Yen-Shin, et al., "Assessment of Pulse-Width Modulation Techniques for Brushless DC Motor Drives", Conference Record of the 2006 IEEE Industry Applications Conference Forty-First IAS Annual Meeting held Oct. 8-12, 2006, pp. 1629-1636 (8 pages).

Smith, Steven W., "The Scientist and Engineer's Guide to Digital Signal Processing", Jan. 1999, pp. 1-650, www.DSPguide.com (664 pages).

\* cited by examiner

BRAKING METHODS

CROSS-REFERENCE TO RELATED APPLICATIONS

This application is a national stage entry of PCT Application No. PCT/BR2021/050512, filed on Nov. 23, 2021, which claims priority to Brazilian Application No. 10 2020 024064 1, filed on Nov. 25, 2020, the contents of all of which are incorporated herein by reference in their entireties.

TECHNICAL FIELD

The present invention refers to the braking of BLDC motors.

More specifically, the present invention refers to braking methods for stopping BLDC motors used in hermetic compressors that are applied, for example, in refrigerating systems.

BACKGROUND OF THE INVENTION

The typical procedure of driving a three phase BLDC motor, that takes place via a three-phase inverter bridge, is known as "six steps", being divided into six electric positions. In this type of driving, only two phases of the BLDC motor are driven at each electric position, such phases through which current will circulate that will generate the driving torque of the BLDC motor. Thus, the third phase remains open, being used for carrying out the monitoring of a voltage induced on the BLDC motor coils and, consequently, the identification of the electric position, enabling the synchronous driving of said BLDC motor.

FIG. 1 of the prior art schematically depicts a typical electronic assembly used for driving a three phase BLDC motor.

As it can be noted from FIG. 1, the electronic assembly comprises a continuous power supply $V_{cc}$ that is associated to a typical inverter bridge 20 used for driving a BLDC motor 10. The continuous power supply $V_{cc}$ can be provided by a converter stage at the entrance, such as a rectifier with a capacitive filter or a DC-DC converter powered by a battery. Thus, the power supply $V_{cc}$ is configured to provide a continuous busbar voltage $V_{bar}$, with a value equal to $V_{cc}$, from the definition of a reference voltage $V_{ref}$ at the lower part of the inverter bridge 20.

The inverter bridge 20 is associated to the continuous power supply and the BLDC motor 10. In addition, the inverter bridge 20 consists of three pairs of switches $S_1$-$S_6$, each pair having an upper switch and a lower switch, and each one of the switches $S_1$-$S_6$ is associated in parallel to a freewheel diode $D_1$-$D_6$. The freewheel diodes $D_1$-$D_6$ have the function of providing a path for the current of the BLDC motor 10, during the operation of the switches $S_1$-$S_6$.

Still according to FIG. 1, the pairs of switches $S_1$-$S_6$ are operatively associated to the phases $F_a$, $F_b$ and $F_c$ of the BLDC motor 10. Thus, as it can be noted in FIG. 1, a first pair of switches $S_1$-$S_2$ is associated to the phase $F_a$ of the BLDC motor 10, a second pair of switches $S_3$-$S_4$ is associated to the phase $F_b$ of the BLDC motor 10 and a third pair of switches $S_5$-$S_6$ is associated to the phase $F_c$ of the BLDC motor 10.

Naturally, the first pair of switches $S_1$-$S_2$ is used for controlling the current $I_a$ in the BLDC motor 10, the second pair of switches $S_3$-$S_4$ is used for controlling the current $I_b$ and the third pair of switches $S_5$-$S_6$ is used for controlling the current $I_c$.

According to FIG. 1, the BLDC motor 10 is a three-phase star motor, modelled by a resistance R in series with an inductance L and a source of induced voltage at each phase, wherein $e_a$, $e_b$ and $e_c$ are the induced voltages in the phases $F_a$, $F_b$ and $F_c$, respectively. Naturally, the BLDC motor comprises a neutral point with central voltage $V_n$.

The electronic assembly according to FIG. 1 also comprises a voltage observer 30, responsible for measuring the three voltages $V_a$, $V_b$ and $V_c$ related to phases $F_a$, $F_b$ and $F_c$ of the BLDC motor 10 and the busbar voltage $V_{bar}$. Additionally, the circuit comprises a control unit 40, operatively associated to the voltage observer 30, responsible for interpreting the voltage signs, identify the present electrical position of the BLDC motor 10 and carry out the correct driving of the inverter bridge 20. In addition, the electronic circuit also uses one only current sensor 50 in the busbar for controlling the current of the BLDC motor 10.

As previously mentioned, during the drive of the BLDC motor only two phases are driven at each electric position. The selection of the phases to be driven depend on the present electric position of the BLDC motor. Thus, the phases that must be driven are the ones with the major induced voltage and the minor induced voltage at a certain electric position. The phase with the major induced voltage must have its upper switch driven, while the phase with the minor induced voltage must have its lower switch driven.

FIG. 2 of the prior art depicts the driving patterns of the switches $S_1$-$S_6$, the waveforms of the voltages applied $V_a$-$V_c$, of the currents $i_a$-$i_b$ and the induced voltages $e_a$-$e_c$ during the "six-step" driving of the BLDC motor. In addition, the "six-step" driving is divided into six electric positions P1-P6 of 60° electrical, totaling 360° electrical. According to FIG. 2, when one of the switches S1-S6 is driven, said switch must operate for 120° electrical. As it can be noted in FIG. 2, the grey areas are the regions where it is possible to monitor the induced voltage of the BLDC motor at each one of the electric positions $P_1$-$P_6$. It is important to highlight that in the beginning of each induced voltage monitoring region there is a disturbance caused by a residual current of the previous electric position, such disturbance ends as soon as the residual current is annulled.

Additionally, the definition of the electric position by means of induced voltage at the third open phase can be done by several techniques, the most known technique being the zero-crossing technique.

The zero-crossing technique consists, basically, of detecting when the induced voltage at the third open phase crosses by zero. However, as represented in FIG. 2, the induced voltage that appears at the open phase is displaced by Vcc/2 and, thus, the detection of the induce voltage crossing is similar, in practice, to the crossing of the open phase voltage by Vcc/2. When detecting the crossing of the induced voltage by zero, the electronic assembly understands that half of a certain electric position was covered and then awaits the same time for carrying out the next change in position.

The patent document PI0004062-2, entitled "MÉTODO DE CONTROLE DE MOTOR ELÉTRICO, SISTEMA DE CONTROLE DE MOTOR ELÉTRICO and MOTOR ELÉTRICO", published in 2002, presents a method of position sensing for BLDC motors based on comparing the phase voltages with each other. Another interesting characteristic of this document is the use of digital filters for filtering the noise introduced by the applied voltage control through the pulse width modulation, such filtering is done by means of a digital filter known by moving average.

As the proper name of the filter shows, the moving average is obtained simply carrying out the average over the last M samples where x[n] represents the input sign of the filter and y[n] represents the output sign of the filter.

$$y[n] = \frac{1}{M}\sum_{k=0}^{M-1} x[n-k]$$

As it was highlighted by Steven W. Smith in his book: The Scientist and Engineer's Guide to Digital Signal Processing, Steven W. Smith, Second Edition, California Technical Publishing, 1999, ISBN 0-9660176-7-6, ISBN 0-9660176-4-1, ISBN 0-9660176-6-8, published in 1999, the moving average can be considered the best solution for certain types of problems, such as, for example, eliminating white noise for smoothing the waveform of the signs at the time dominium.

In the case of monitoring induced voltage of BLDC motors, the answer in frequency of such type of filter results in a simpler and optimum solution for eliminating the harmonics introduced by the pulse width modulation. This is because the attenuation valleys of this type of filter match exactly the harmonics generated by pulse width modulation.

According to this proposal, the moving average must be carried out at a sampling frequency $F_s$, multiple of the switching frequency $F_{sw}$ used in the pulse width modulation, and the number of samples M, where it is carried out the moving average, must be equal to the relation between the sampling frequency and the switching frequency.

Yet the patent document U.S. Pat. No. 6,512,341 (B2), entitled "APPARATUS AND METHOD OF DRIVING A BRUSHLESS MOTOR", published on 14 Mar. 2002, monitors if the read voltage is clamped at the busbar voltage or in the reference of the inverter bridge before activating the induced voltage processing BEMF by the electric position sensing. Such disturbance at the read voltage in the open phase takes place during the extinction of the residual current originated at the previous step, before the phase is open, and needs to be treated in order not to disturb the position sensing.

Moreover, there are several switching patterns for driving the BLDC motors, such as the patterns analyzed in the document "Assessment of Pulse-Width Modulation Techniques for Brushless DC Motor Drives" by LAI, Y.-S. and LIN, Y.-K. Published in 2006 at the *Conference Record of the 2006 IEEE Industry Applications Conference Forty-First IAS Annual Meeting* (article published in 2006), wherein the differences between such patterns consist of: possibility of circulating the residual current by the DC busbar, duration of the residual current and restrictions of the driving circuit of the driving switches. Such patters can be seen, for example, in FIG. 3 of the prior art.

However, in spite of existing many techniques for driving the BLDC motors, little has been published regarding the braking techniques.

In this sense, a common technique in the stops of motors, not only in the case of BLDC motors, is to carry out a short-circuit of the three phases of the motor with the aim of dissipating all the kinetic energy stored in the rotor through the stator coils. However, such technique has as a disadvantage the appearance of high currents in the motor, such currents being greater than the ones found during a normal operation and above the operating limits, which can be a problem, especially for the BLDC motors, due to the limits of currents defined in order to guarantee the magnetization of its magnets.

Another disadvantage of the technique which carries out the short-circuit of the three phases of the motor is the loss of information about the motor position due to the complete masking of the signs of induced voltage of the motor, such signs are used for identifying the electric position when driving BLDC motors. In the case of application in hermetic compressors used in refrigerating systems, the position of the stop of the motor is very useful for carrying out the correct positioning of the piston on the next start.

Another braking technique consists of reducing the revolution up to the minimum possible and only then switch off the motor, leaving it to stop as its residual inertial energy is consumed by the load. However, such technique has not proved viable for application in hermetic compressors used in refrigerating systems.

Finally, it is important to highlight that the non-use of a braking technique to stop a compressor can result in several problems, as for example, the excessive displacement of the mechanic kit, the wear caused in the springs due to such displacement, the shock of the mechanic kit with the casing and the vibration of the compressor at very low revolutions.

SUMMARY

One objective of the present invention consists of providing a rheostatic braking method that avoids the drawbacks of the prior art.

Such object is reached by means of a rheostatic braking method, applied on a BLDC motor used in hermetic compressors, comprising:

selecting a first phase and a second phase, connected to the BLDC motor, which will be short-circuited, at a certain electric position of the BLDC motor, wherein the first phase and the second phase selected are the phases having the major induced voltage and the minor induced voltage at a certain electric position of the BLDC motor;

maintaining a third open phase to monitor the electric position of the BLDC motor by means of monitoring the induced voltage at this third open phase; and separating the rheostatic braking in six electric positions, each electric position being associated to two electric sections: a first section before zero crossing of the induced voltage of the third open phase; and a second section after the zero crossing.

Additionally, the method according to the present invention consists of the fact that when the induced voltage at the third open phase is positive, the short-circuit is carried out through the lower switches of the first phase and second phase, and when the induced voltage at the third open phase is negative, the short-circuit is carried out through the upper switches of the first phase and second phase.

Moreover, the method according to the present invention consists of the fact that the change of the first section to second section, at each electric position, is carried out through the monitoring of the induced voltage at the third open phase and at the moment of the zero crossing of the induced voltage at the third open phase.

Besides, the method according to the present invention comprises replicating the same driving configuration of the switches of the first section in the second section, applying the same driving configuration at the switches during all the electric position.

The method according to the present invention also consists of the fact that the change of position is done after a waiting time, wherein such waiting time is equal to the time measured between the last change of position and the detection of the zero crossing.

In addition, the method according to the present invention consists of the fact that the next electric position is anticipated in 30° electrical, wherein the change of position is done soon after the detection of the zero crossing of the induced voltage at the third open phase, preventing the occurrence of an undesired current during all the electric position and allowing more time for extinguishing the residual current after a change of position.

Furthermore, the method according to the present invention consists of the fact that a pulse width modulation, with a certain duty cycle, is applied on one of the switches, wherein the switch selected is that, when open, causes the current to circulate through the busbar.

In addition, the method according to the present invention consists of the fact that the control of the duty cycle of the pulse width modulation is done in function of the desired braking current, of the equivalent resistance between two phases, of the busbar voltage and of the estimated induced voltage.

Additionally, the method according to the present invention consists of the fact that the duty cycle begins with an initial minimum value and increases at a determined increment rate until the duty cycle is equal to 100%.

Furthermore, the method according to the present invention consists of the fact that the desired braking current is equal or less than the limit of the maximum current of the BLDC motor.

In addition, the method according to the present invention consists of the fact that the induced voltage at the third open phase is obtained by means of an average voltage read at the third open phase and compensated by subtracting the busbar voltage over twice the complementary duty cycle.

Additionally, the method according to the present invention consists of the fact that the average voltage read at the third open phase is obtained by means of processing the voltage read at said third open phase by means of a moving average digital filter.

Additionally, the method according to the present invention consists of the fact that the moving average digital filter is carried out by a multiple sampling frequency of the switching frequency of the pulse width modulation and the number of samples equal to the relation between the sampling frequency of the filter and the switching frequency.

Moreover, the method according to the present invention consists of the fact that the monitoring of the voltage at the third open phase is conducted only after the extinction of the residual current of said third open phase or after a minimum time.

In addition, the method according to the present invention consists of the fact that the occurrence of the residual current is detected by analyzing the voltage of the third open phase, being equal to the busbar voltage ($V_{bar}$) when the current at the third open phase is leaving and equal to zero when the current at the third open phase is entering.

One advantage of the method according to the present invention comprises avoiding great displacements of the mechanic kit, avoiding that it hits the casing of the compressor and also avoiding the wear of the springs, which could impair the reliability of the compressor.

Another advantage of the method according to the present invention comprises controlling the current in the motor during the braking procedure, thus guaranteeing the protection of the magnets of the motor against demagnetization.

Another advantage of the method according to the present invention comprises knowing in which position the BLDC motor stopped, guaranteeing the correct positioning of the BLDC motor before the next start without requiring special techniques to find out the positioning of the piston before the start procedure.

BRIEF DESCRIPTION OF THE DRAWINGS

The objectives and advantages of the present invention will become clearer through the following detailed description of the examples and non-limiting drawings presented at the end of this document.

DETAILED DESCRIPTION

[Rheostatic Braking]

The rheostatic braking method, applied on a BLDC motor 10 used in hermetic compressors with application, for example, in refrigerating systems, object of the present invention, comprises dissipating the kinetic energy through heating at the resistances R of the BLDC motor 10.

In this type of braking, the two phases selected for the biphasic short-circuit are the phases having the major and the minor induced voltage at a determined electric position of the BLDC motor 10. It is important to highlight that the choice of the biphasic short-circuit is carried out at the upper or lower driving switches, of the two phases of interest, it is fundamental to avoid the occurrence of an undesired current at the third open phase. The occurrence of such undesired current at the third open phase can mask the induced voltage of the BLDC moor 10 and, consequently, the loss of information of the electric position of said BLDC motor 10 via sensing through the induced voltage.

In this sense, the choice of the switches, for carrying out the biphasic short-circuit, will depend on the induced voltage at the third open phase.

Figure 1:
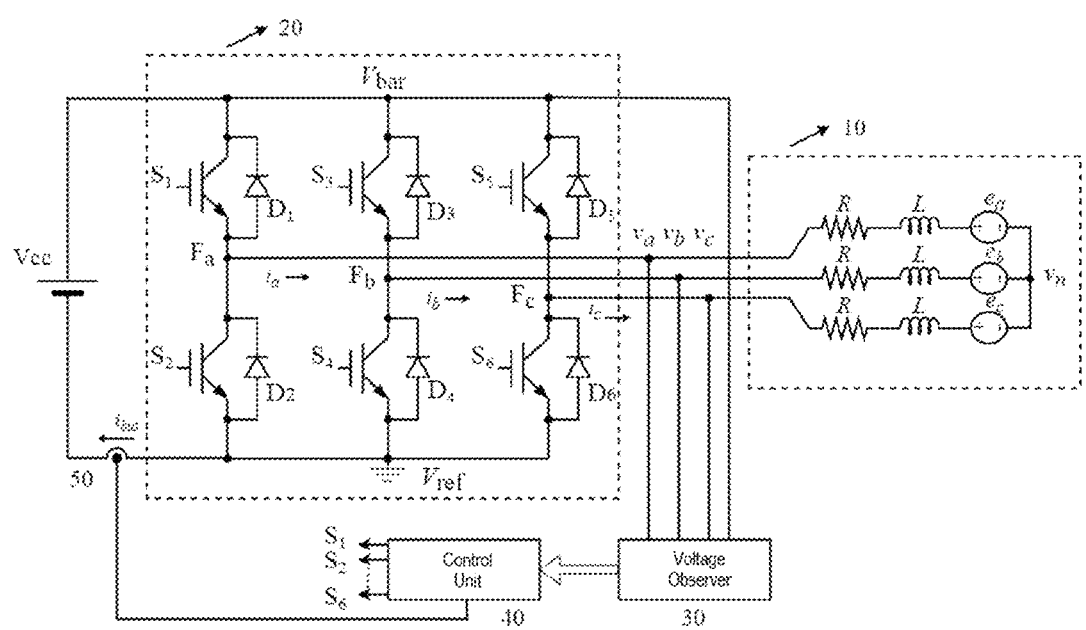
FIG. 1 schematically depicts a typical electronic assembly used for driving a BLDC motor.
Figure 2:
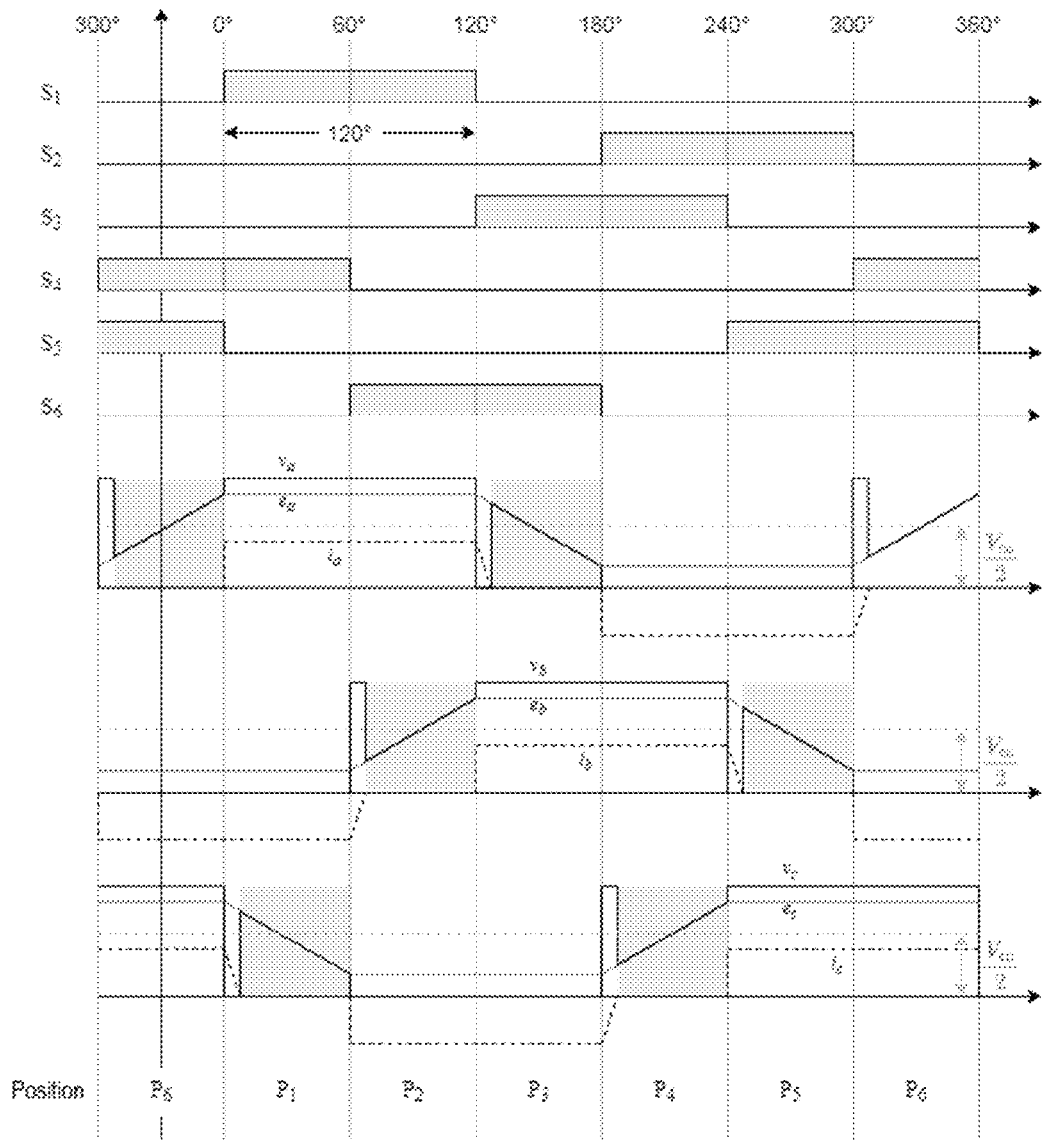
FIG. 2 depicts the resulting waveforms during the driving of a BLDC motor.
Figure 3:
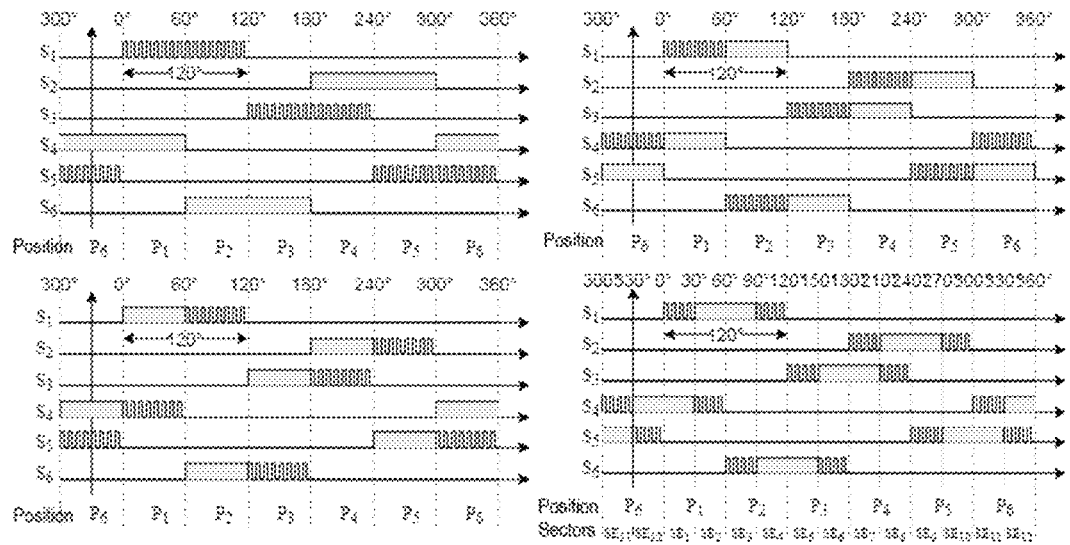
FIG. 3 depicts several pulse width modulation techniques known in the prior art.
Figure 4:
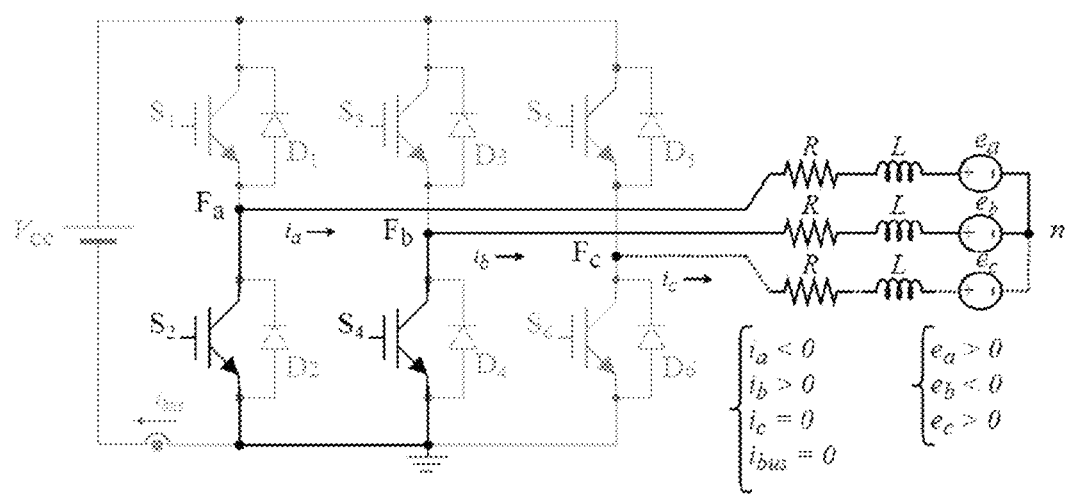
FIG. 4 depicts a possible application of the rheostatic braking method according to the present invention.

Thus, taking as example FIG. 4, if the induced voltage $e_c$ at the third open phase $F_c$ is positive, the lower switches $S_2$ and $S_4$ are selected for performing the biphasic short-circuit at the two phases of interest $F_a$ and $F_b$. With this, a central voltage $V_n$ goes to 0 V (reference voltage), and the voltage value $V_c$ at the third open phase $F_c$ is between 0 V and a busbar voltage $V_{bar}$, said busbar voltage $V_{bar}$ having the same voltage value than the power supply $V_{cc}$. Thus, the induced voltage $e_c$ at the third open phase $F_c$ is not able to polarize none of the freewheel diodes $D_5$ and $D_6$ associated and, thus, does not generate undesired current.

Figure 5:
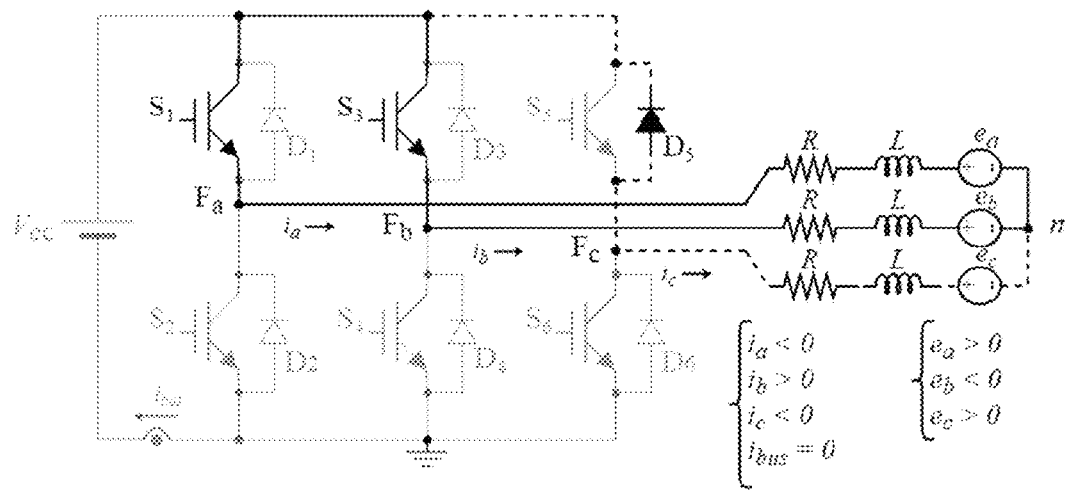
FIG. 5 depicts a possible non-recommended application of the rheostatic braking method according to the present invention.

However, taking as example FIG. 5, if the induced voltage $e_c$ at the third open phase $F_c$ is positive, and the upper drive switches $S_1$ and $S_3$ are chosen for performing the biphasic short-circuit, the central voltage $V_n$ will be equal to the busbar voltage $V_{bar}$. Thus, the voltage $V_c$ at the third open phase $F_c$ will be greater than the busbar voltage $V_{bar}$, directly polarizing the upper freewheel diode $D_5$, of said third open phase $F_c$, and causing the circulation of an undesired current int the BLDC motor 10, precluding the identification of the electric position of the BLDC motor 10 since such current masks the induced voltage at the third open phase $F_c$.

Figure 6:
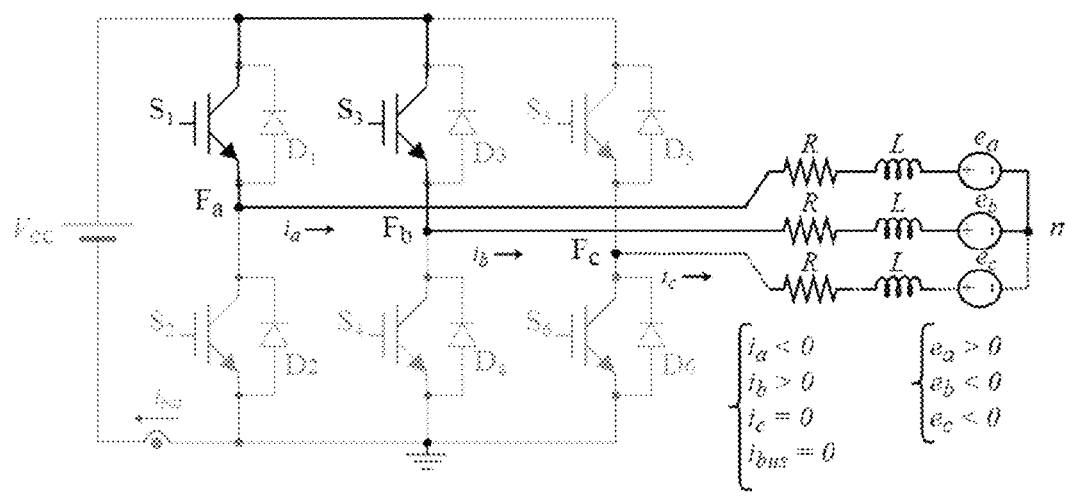
FIG. 6 depicts a possible application of the rheostatic braking method according to the present invention.

Alternatively, taking as example FIG. 6, if the induced voltage $e_c$ in the third open phase $F_c$ is negative, the upper switches $S_1$ and $S_3$ are selected for performing the biphasic short-circuit in the two phases of interest $F_a$ and $F_b$. With this, the central voltage $V_n$ is equal to the busbar voltage $V_{bar}$, and the voltage value $V_c$ at the third open $F_c$ is between the busbar voltage $V_{bar}$ and 0 V (reference voltage). Thus, the induced voltage $e_c$ in the third open phase $F_c$ is not able to polarize none of the freewheel diodes associated and, thus, it does not generate an undesirable current.

Figure 7:
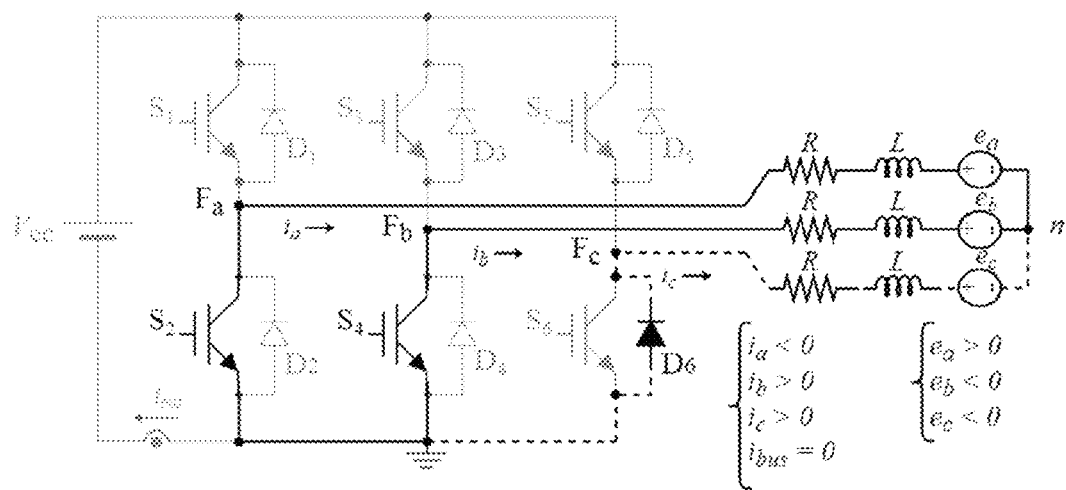
FIG. 7 depicts a possible non-recommended application of the rheostatic braking method according to the present invention.

However, as it can be noted in FIG. 7, if the induced voltage at the third open phase is negative, and the lower switches $S_2$ and $S_4$ are chosen for carrying out the biphasic short-circuit, the central voltage $V_n$ will be equal to the reference voltage. Thus, the voltage $V_c$ at the third open phase $F_c$ will be less than zero, directly polarizing the lower freewheel diode $D_6$ and causing the circulation of an undesired current in the BLDC motor 10, precluding the identification of the electric position of BLDC motor 10 since this current masks the induced voltage $e_c$ at the third open phase $F_c$.

Within this context, it is possible to alter the rheostatic braking method above described in order to improve the monitoring of an induced voltage at a third open phase. Basically, such alteration comprises dividing the six electrical positions commonly used into twelve electric sections, wherein each electric position is associated to two electric sections. Thus, each electric position is divided in two sections, a first section before zero crossing of the induced voltage at the third open phase, and a second section after zero crossing. With this, it is possible to prevent the masking of the induced voltage in the open phase, such as demonstrated in FIGS. 4 and 6, enabling the adequate sensing of the motor position by means of the induced voltage in the open phase.

Figure 8:
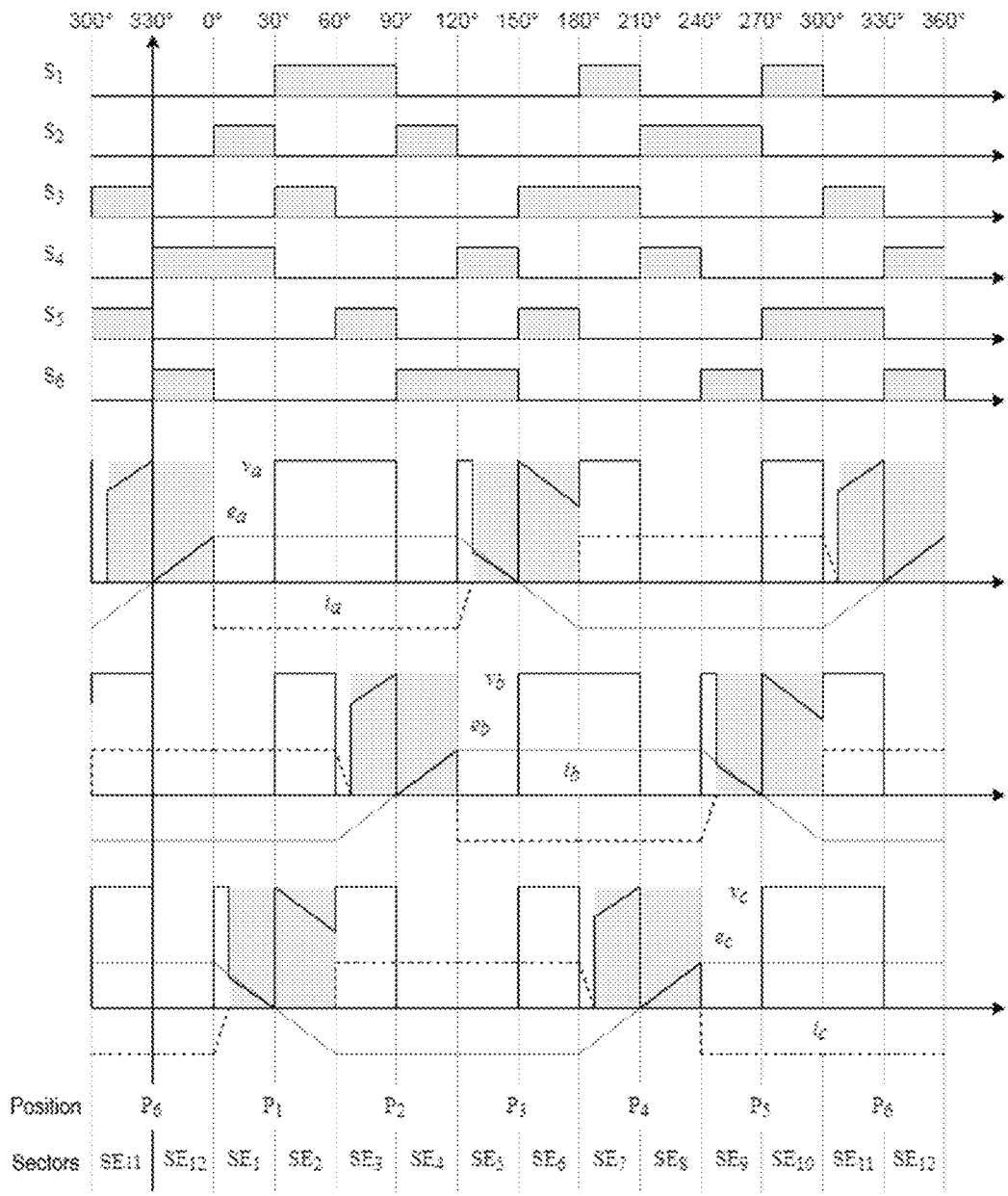
FIG. 8 depicts resulting waveforms of a division of six positions of the BLDC motor in twelve electric sections and an improved monitoring of an induced voltage at the open phase of a BLDC motor with the rheostatic braking according to the present invention.

The result obtained with such first way of improved monitoring of an induced voltage at a third open phase can be noted in FIG. 8, where the gray areas are the regions where it is possible to monitor said induced voltage during braking. According to FIG. 8, the electric positions $P_1$-$P_6$ are divided into twelve electric sections $SE_1$-$SE_{12}$.

Additionally, a second way of altering the rheostatic braking method to improve monitoring of an induced voltage at a third open phase comprises maintaining six electric positions and replicate the driving configuration of the switches of the first electric section at the second electric section, that is, the driving configuration of the switches defined for the first section is applied during all the electric position, avoiding the occurrence of an undesired current at the third open phase until the detection of a zero crossing.

Thus, based on the detection of zero crossing, the next shifting of the electric position is programmed for thirty electrical degrees after said detection. The result obtained with such second improved monitoring way of an induced voltage at a third open phase can be seen in FIG. 9, where the gray areas are the regions where it is possible to monitor said induced voltage during braking. According to FIG. 9, it is possible to observe, for example, at the electrical position $P_1$, that the switches $S_2$ and $S_4$ have the same driving configuration from the beginning until the end of this position. Additionally, it is also possible to observe, for example, the braking changes to an electrical position $P_2$ thirty electric degrees after detecting the zero crossing in the electric position $P_1$.

The difference between the first way and the second way is the fact that the second way allows the occurrence of the undesired current after zero crossing. However, as the position identification by means of zero crossing has already been done, the masking of the induced voltage of the open phase at the second half of the position is not a problem.

Additionally, a third way of altering the rheostatic braking method to improve monitoring of an induced voltage in a third open phase comprises maintaining the six electric positions and anticipate the next position in thirty electric degrees, avoiding the occurrence of the undesired current during all the position.

Figure 10:
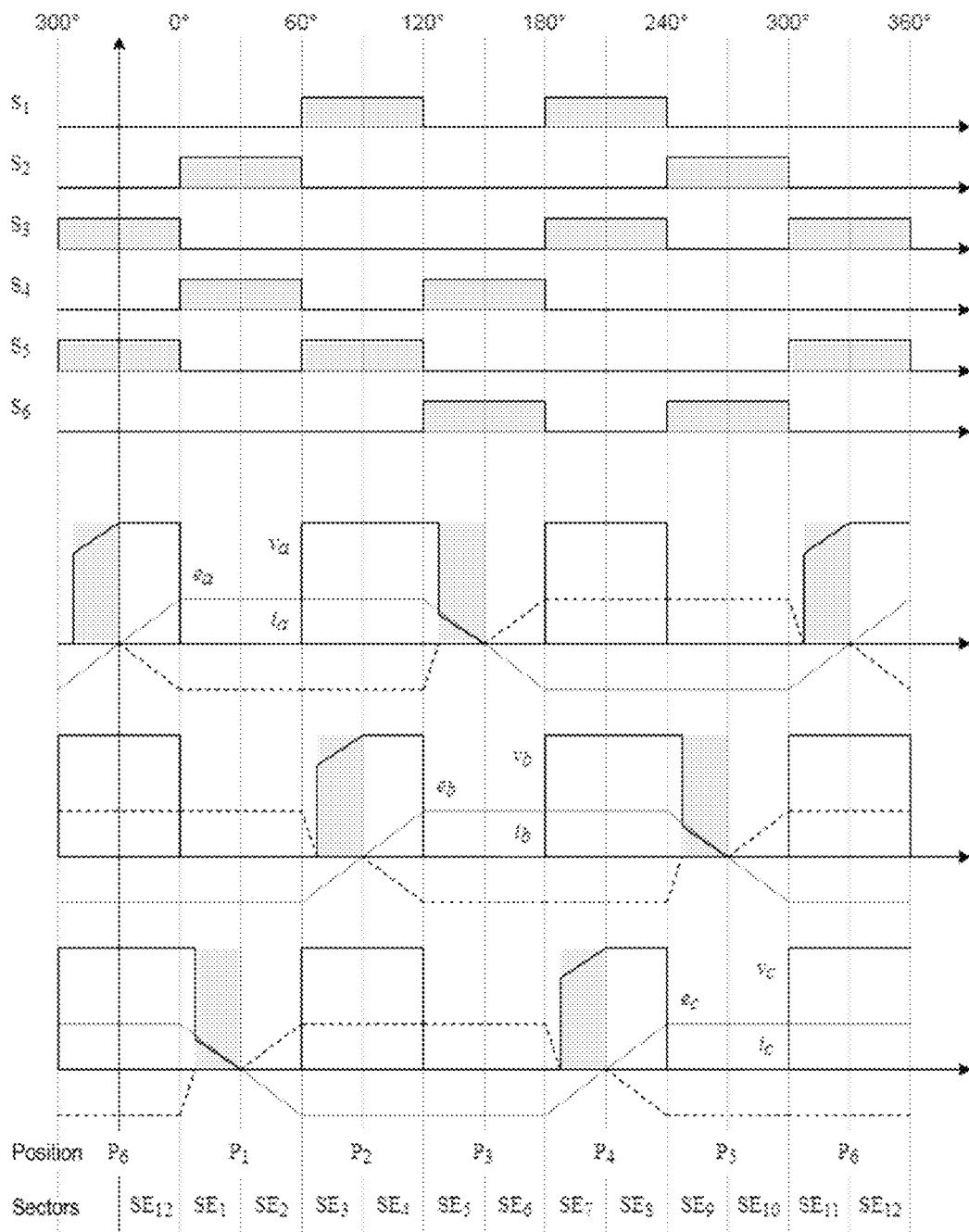
FIG. 10 depicts resulting waveforms of a common application of six electric positions of a BLDC motor and an anticipation of thirty electric degrees during a change of position of said BLDC motor with the rheostatic braking according to the present invention.

The result obtained with such third way of altering the rheostatic braking method can be observed in FIG. 10, where the gray areas are the regions where it is possible to monitor said induced voltage during braking. According to FIG. 10, it is possible to observe the anticipation of shifting of electric positions in 30° electrical.

The difference between the second way and the third way is the fact that the third way allows a greater time for extinguishing the residual current of the open phase soon after a change in position. The time available for extinguishing the residual current goes from the moment of changing the position until the zero crossing. While in the second way it is necessary that the residual current is extinct before 30 electrical, in the third way such current can be extinct in until 60° electrical, without impairing the detection of the zero crossing by position sensing.

[Rheostatic Braking with Pulse Width Modulation]

The rheostatic braking method can be associated to a pulse width modulation and used in a BLDC motor 10 applied in hermetic compressors that are applied, for example, in refrigerating systems, objective of the present invention.

Figure 11:
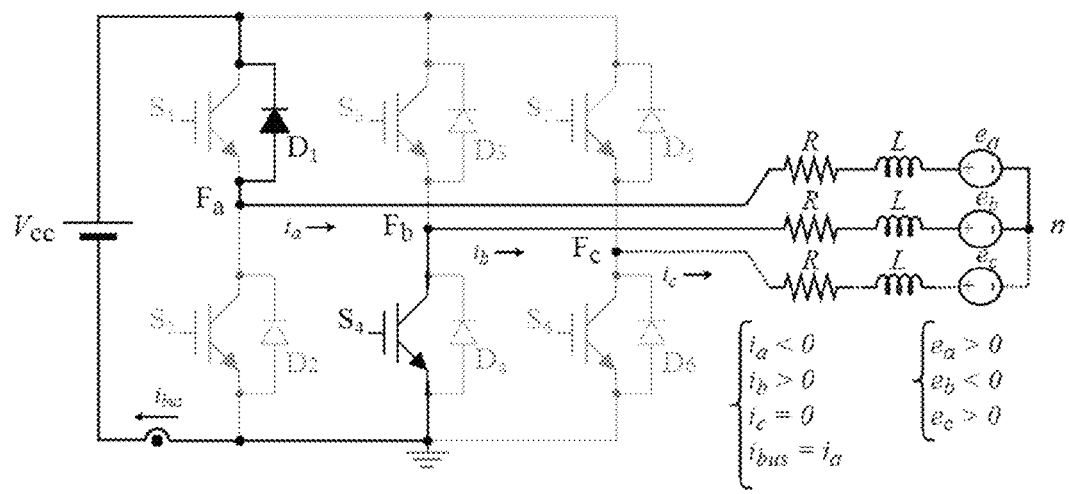
FIG. 11 depicts a possible recommended application of the rheostatic braking method with pulse width modulation according to the present invention, during the application of a short-circuit through the lower switches.
Figure 12:
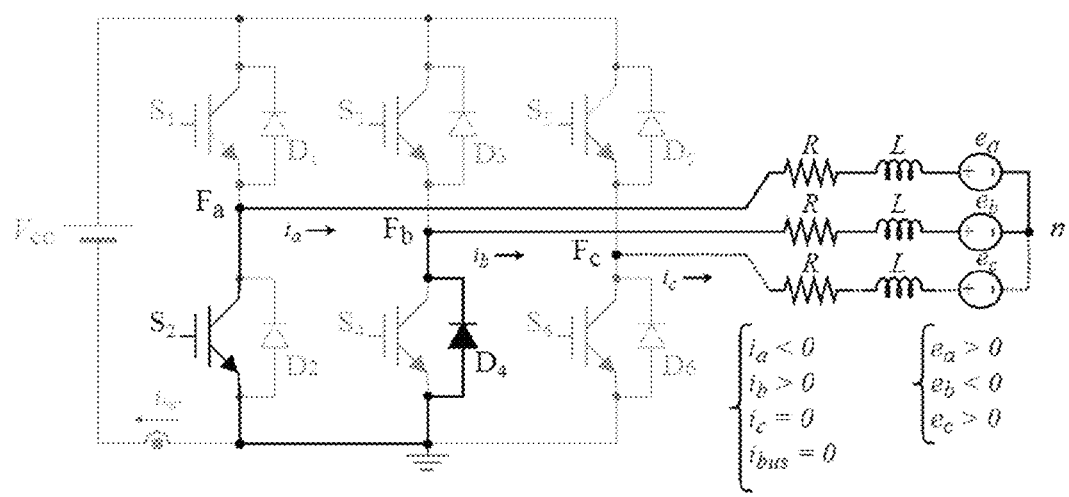
FIG. 12 depicts a possible non-recommended application of the rheostatic braking method with pulse width modulation according to the present invention, during the application of a short-circuit through the lower switches.
Figure 13:
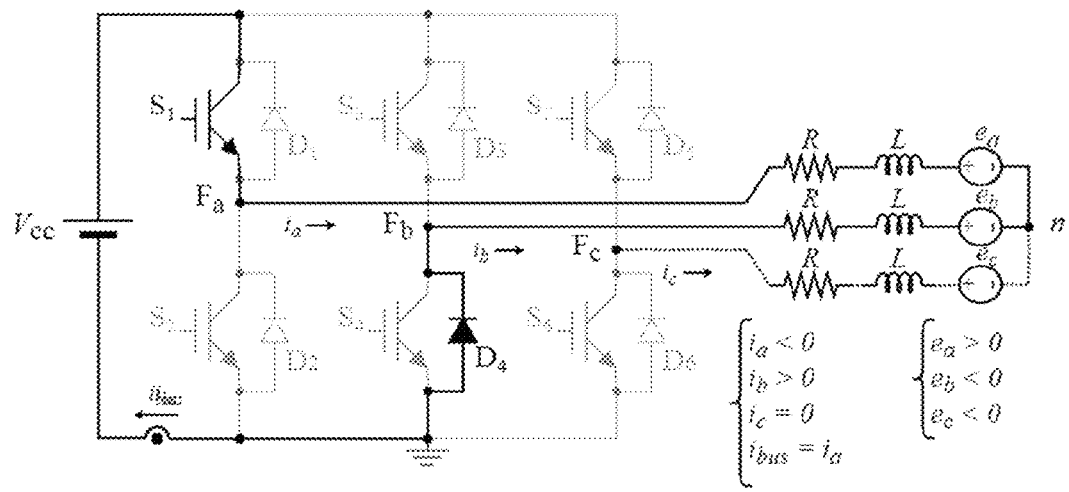
FIG. 13 depicts a possible application of the rheostatic braking method with pulse width modulation according to the present invention, during the application of a short-circuit through the upper switches.
Figure 14:
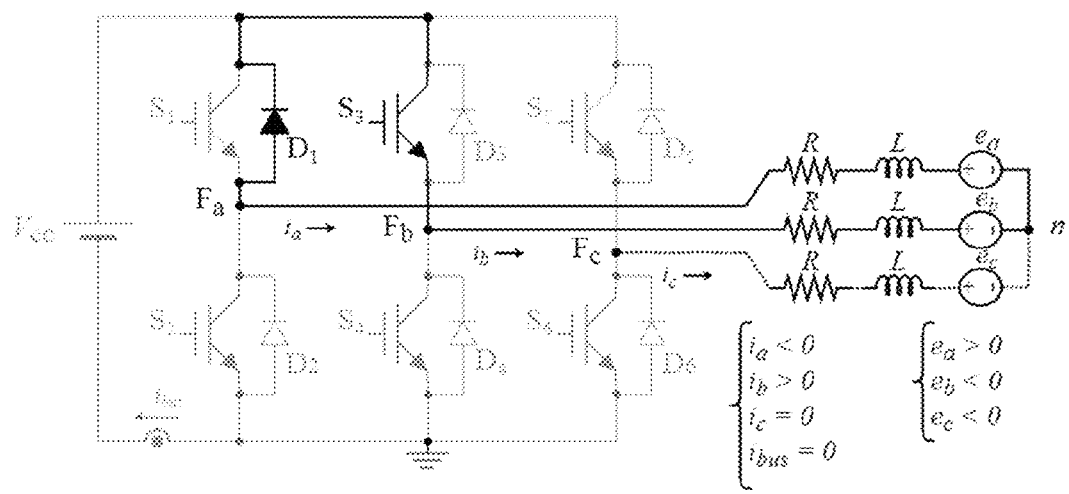
FIG. 14 depicts a possible non-recommended application of the rheostatic braking method with pulse width modulation according to the present invention, during the application of a short-circuit through the upper switches.

In this case, a pulse width modulation sign is applied on one of the two switches driven in a determined electric position for short-circuiting the rheostatic braking, the switch being selected is the one that, when open, causes the current to circulate through the busbar, causing that part of the power returns to the busbar during the time of opening said switch, actuating momentaneous in a similar way to a regenerative braking. According to FIG. 11 of the present invention, when the short-circuit is applied on the lower switches $S_2$ and $S_4$, if the pulse width modulation is applied on the switch $S_2$, when the switch $S_2$ opens the current will return through the freewheel diode $D_1$ and will circulate through the busbar. However, when the short-circuit is applied on the switches $S_2$ and $S_4$, if the pulse width modulation is applied on the switch $S_4$, when the switch $S_4$ opens there will not be difference in the path of the current, as it can be observed in FIG. 12. Optionally, according to FIG. 13 of the present invention, when the short-circuit is applied on the upper switches $S_1$ and $S_3$, if the pulse width modulation is applied on the switch $S_3$, when the switch $S_3$ opens the current will return through the freewheel diode $D_4$ and will circulate through the busbar. However, when the short-circuit is applied on the switches $S_1$ and $S_3$, if the pulse width modulation is applied on the switch $S_1$, when the switch $S_1$ opens there will not be difference in the path of the current, as can be observed in FIG. 14.

Thus, the rheostatic braking method with pulse width modulation allows the current circulating by the BLDC motor 10 to be controlled. This because, at a determined electric position, when the two switches are closed the current increases and when only one switch is closed the current is reduced. The current increases when the two switches are closed as the voltage over the motor coils is the induced voltage. The current is reduced when only one switch is closed as the voltage over the motor coils is the induced voltage less the busbar voltage, the busbar voltage is bigger than the induced voltage during braking.

With this, it is possible to control the current circulating by the BLDC motor 10 by means of the definition of the cyclic ratio of the pulse width modulation applied to one of the switches, causing the switch to operate once closed and then open at the same electric position.

Figure 15:
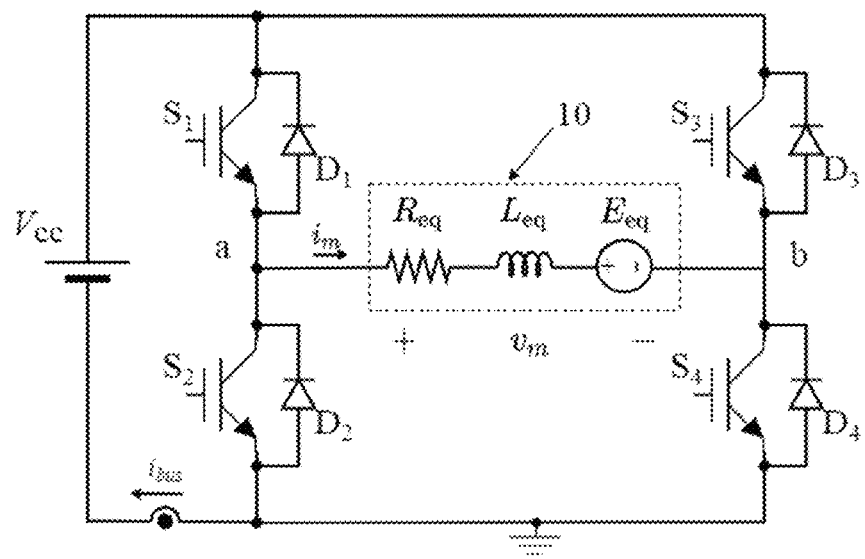
FIG. 15 depicts a simplified model of the BLDC motor during the driving of the phases A and B.

FIG. 15 depicts a simplified model of the BLDC motor 10, wherein $L_{eq}$ is the equivalent inductance of phases A and B, $R_{eq}$ is the equivalent resistance of the phases A and B, and $E_{eq}$ is the induced voltage equivalent between the phases A and B.

Taking into account the answer of the electric magnitudes is much faster than the answer of the mechanic magnitudes, it is possible to neglect the inductance effect $L_{eq}$ and carry out the control of the open mesh current through the voltage applied on the BLDC motor 10 according to the following equation:

$$v_m = R_{eq} \cdot I_{des}$$

where $v_m$ is the average voltage over the BLDC motor coils, 10, and $I_{des}$ is the desired braking current.

In its turn, the average voltage $v_m$ can be calculated within a period of pulse width modulation, according to the following equations:

$$v_m = \frac{1}{T_{PWM}}\left[\int_0^{t_{on}} E_{eq} dt + \int_{t_{on}}^{T_{PWM}} (E_{eq} - V_{CC}) dt\right]$$

$$v_m = \frac{1}{T_{PWM}}\left[\int_0^{T_{PWM}} E_{eq} dt - \int_0^{t_{off}} V_{CC} dt\right]$$

$$v_m = E_{eq} - \frac{t_{off}}{T_{PWM}} V_{CC}$$

where $t_{on}$ is the time wherein the two switches are driven at a determined electric position for short-circuiting the rheostatic braking, $t_{off}$ is the time wherein one of the switches is open by the pulse width modulation and $T_{PWM}$ is the complete period of a cycle of pulse width modulation.

Still, the duty cycle dc defined in function of the time $t_{on}$, of the time $t_{off}$ and of the modulation period $T_{PWM}$ according to the following equation:

$$dc = t_{on}/T_{PMW}$$

and the complementary duty cycle $\overline{dc}$ equal to the equation below:

$$\overline{dc} = 1 - dc = t_{off}/T_{PMW}$$

Thus, making the due substitutions on the equations above, it is possible to carry out the control of the desired braking current $I_{des}$ by means of the duty cycle dc, according to the following equation:

$$dc = 1 - \overline{dc} = \frac{E_{eq} - R_{eq} \cdot I_{des}}{V_{CC}}$$

The equivalent induced voltage $E_{eq}$ can be replaced by an estimated voltage $E_m$, which is the peak-to-peak voltage of the induced voltage and, in function of a constant of flow $k_\varphi$, depending on the constructive parameters of the motor, and the speed of the motor $\omega_m$.

$$E_m = k_\varphi \cdot \omega_m$$

In its turn, the speed of the motor $\omega_m$ can be calculated in function of the time measured between each change of electric position.

In addition, as the BLDC motor 10 starts decelerating, the time where the switch needs to be open for controlling the current diminishes, as the induced voltage on the BLDC motor 10 also falls, until it is no longer necessary to control the current. The control of the current is no longer necessary when the induced voltage is so low that it does no longer present a risk of generating high currents able to demagnetize the BLDC motor 10. In this point, when the induced voltage is very low, or more specifically when the duty cycle dc calculated is greater than 100%, due to the reduced speed, only the pure rheostatic braking is applied, with no pulse width modulation, until the BLDC motor 10 stops. In addition, the initial minimum value of the cyclic ratio dc and the increment rate used for the said cyclic ratio reaches 100% are empirically defined, in order that the current on the BLDC motor 10 is equal or less than the desired braking current $I_{des}$.

Moreover, the rheostatic braking method with pulse width modulation can be associated to three ways of altering the rheostatic braking method for promoting the improved monitoring of an induced voltage at a third open phase.

Figure 16:
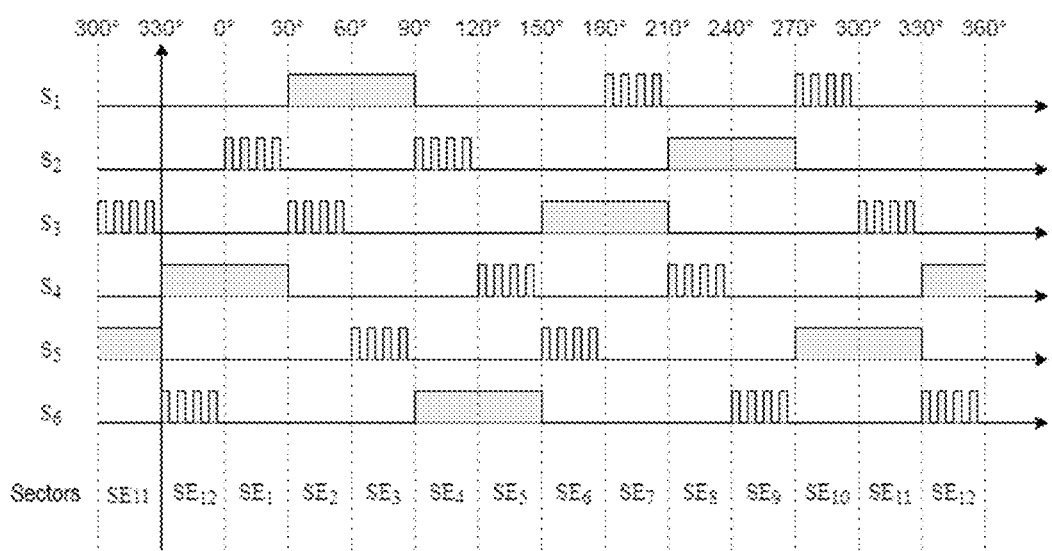
FIGS. 16 and 17 depict the patterns of pulse width modulation that can be associated to the rheostatic braking method according to the present invention.

FIG. 16 depicts the pulse width modulation patterns applied on the driving switches $S_1$-$S_6$ with the twelve electric sections $SE_1$-$SE_{12}$, that is, the first alteration of the rheostatic braking method for improved monitoring of an induced voltage at a third open phase.

Figure 17:
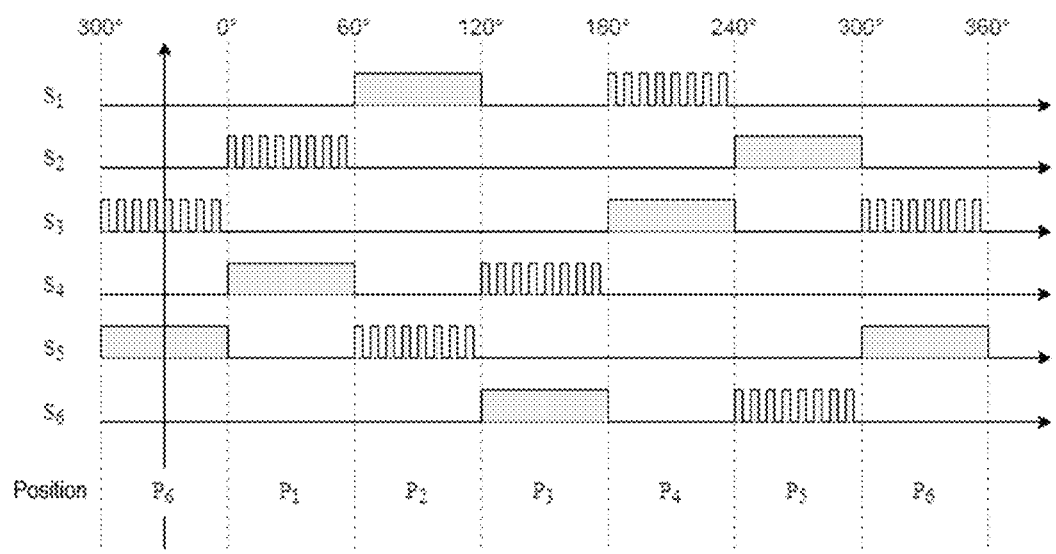

In addition, FIG. 17 depicts the pulse width modulation patterns applied on the driving switches with six electric positions, that is, the second alteration on the rheostatic braking method.

Figure 18:
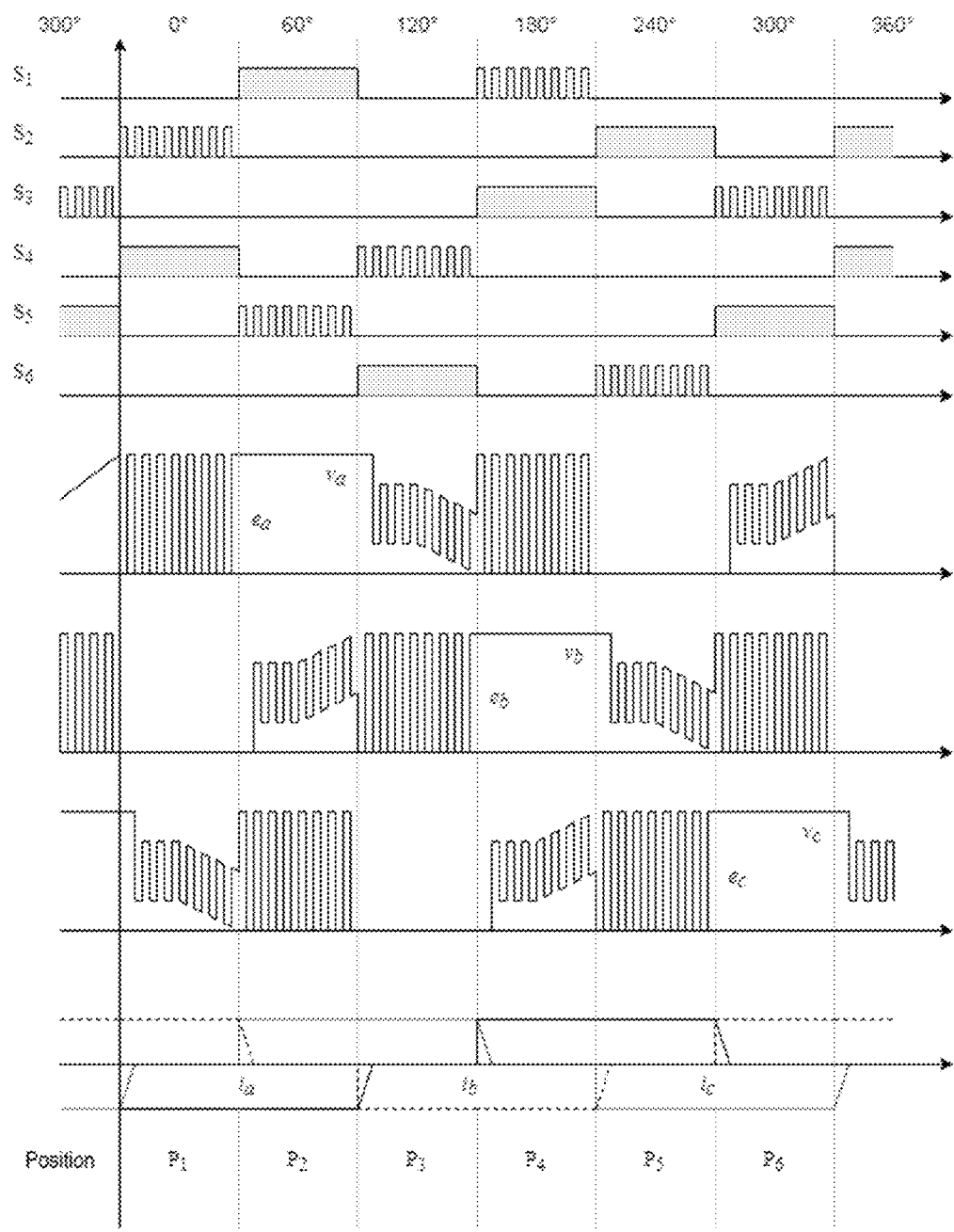
FIG. 18 depicts one of the patterns of pulse width modulation and the resulting waveforms of the rheostatic braking method with pulse width modulation according to the present invention.

Still, FIG. 18 depicts the pulse width modulation patterns applied on the driving switches $S_1$-$S_6$ with six electric positions $P_1$-$P_6$ and with the anticipated shifting in 30° electrical, that is, the third alteration of the rheostatic braking method. Additionally, FIG. 18 also depicts the result obtained on the electric magnitudes of BLDC motor 10 with the application of such third alteration.

The association of the rheostatic braking method with pulse width modulation is also useful during braking of the BLDC motor 10 at power failure, as, in this case, the power required to maintain the inverter working would come from the inertia itself of said BLDC motor 10.

[Monitoring of an Induced Voltage at a Third Open Phase]

Finally, the boundary conditions related to the monitoring of an induced voltage at a third open phase must be taken into account for each one of the braking methods described above.

In a general way, when only two phases are driven, we can apply the law of the Kirchhoff voltages to define which is the central voltage $V_n$ of a star connected three phase BLDC motor 10:

$$\begin{cases} v_N = v_a - R \cdot i_a - L \cdot i'_a - e_a \\ v_N = v_b - R \cdot i_b - L \cdot i'_b - e_b \end{cases}$$

$$2v_N = (v_a + v_b) - R \cdot (i_a + i_b) - L \cdot (i'_a + i'_b) - (e_a + e_b)$$

wherein $V_n$ is the central voltage, $V_a$ is the voltage applied in phase $F_a$, $V_b$ is the voltage applied in phase $F_b$, R is the resistance of the BLDC motor 10 phase, L is the phase inductance of the BLDC motor 10, ia is the current circulating in phase $F_a$, $i_b$ is the current circulating in phase $F_b$, $e_a$ is the induced voltage in phase $F_a$; and $e_b$ is the induced voltage in phase $F_b$.

Thus, taking as example the phase $F_c$ as the third open phase, and the phases $F_a$ and $F_b$ as the driven phases, wherein one of the driven phases is the phase with major voltage and the other phase the phase with minor voltage, it is possible to define the following boundary conditions:

$$\begin{cases} i_b = -i_a \\ i'_b = -i'_a \\ e_b = -e_a \end{cases}$$

wherein the current $i_a$ that enters into phase $F_a$ is equal to the current $i_b$ that leaves the phase $F_b$, as only two phases are conducting, the same is true for the current derivative $i_a'$ and the current derivative $i_b'$, and the induced voltage $e_a$ in phase $F_a$ is equal to the induced voltage $e_b$ in phase $F_b$, but with an inverted sign, as it refers to a trapezoidal waveform BLDC motor.

Replacing the boundary conditions defined above in the equation of the central voltage $V_n$, we have:

$$2v_N = (v_a + v_b) - R \cdot (i_a - i_a) - L \cdot (i'_a - i'_a) - (e_a - e_a)$$

$$v_N = \frac{(v_a + v_b)}{2}$$

The applied voltage $V_c$ in the third open phase $F_c$ can then be defined as:

$$v_c = v_N + e_c$$

And the induced voltage $e_c$ in the third open phase $F_c$ can then be calculated as:

$$e_c = v_c - v_N$$

$$e_c = v_c - \frac{(v_a + v_b)}{2}$$

In the case of rheostatic braking, the short-circuit can be carried out by means of upper and lower driving switches of the phases $F_a$ and $F_b$. In this case, we have two situations:

$e_c = v_c - 0$, when the lower driving switches are being driven; and $e_c = v_c - V_{bar}$, when the upper driving switches are being driven.

Figure 9:
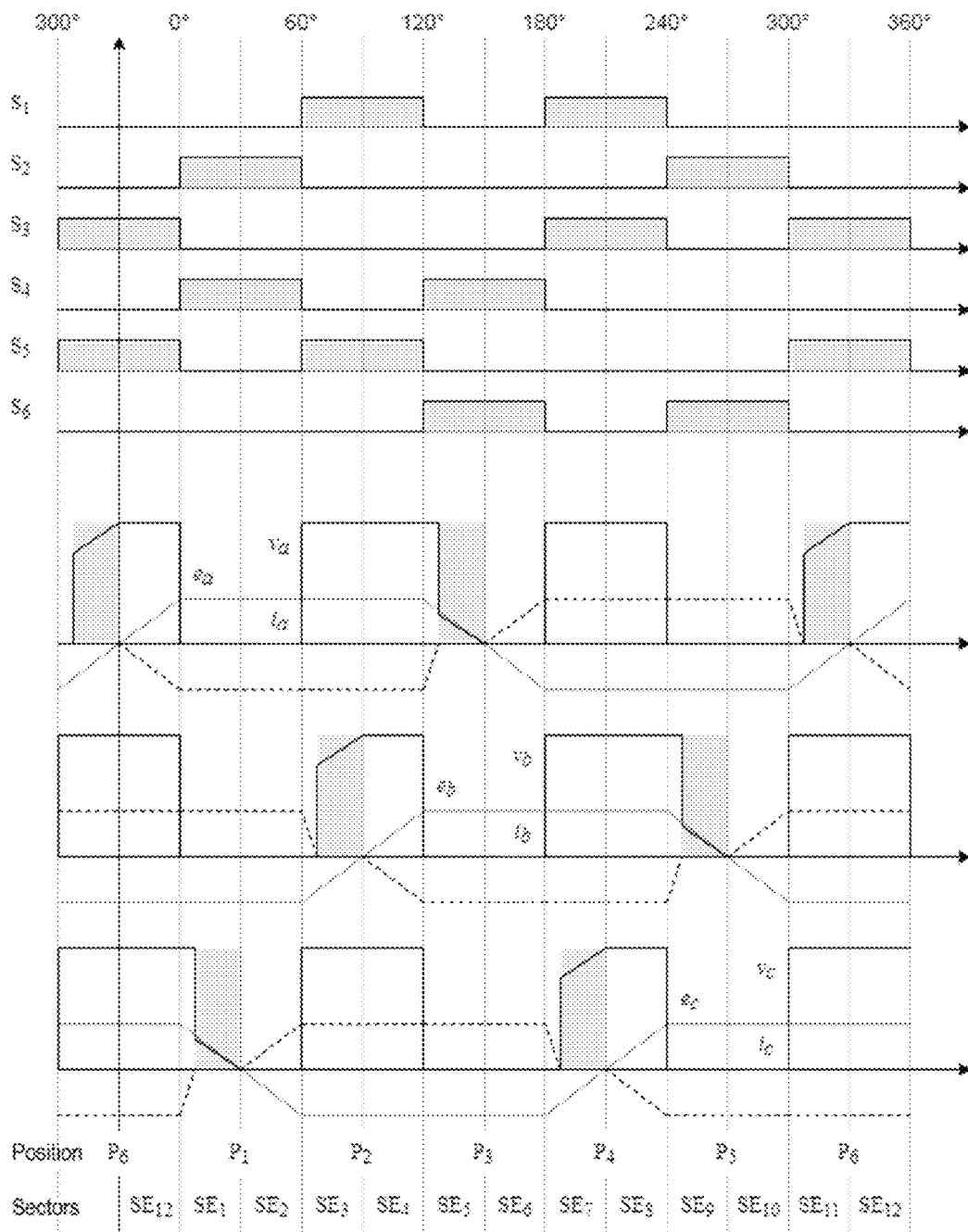
FIG. 9 depicts resulting waveforms of a common application of six electric positions of a BLDC motor and an improved monitoring of an induced voltage at the open phase of a BLDC motor with the rheostatic braking according to the present invention.

Thus, when the lower driving switches are being driven, the induced voltage crossing $e_c$ by zero is equivalent to the crossing of the voltage $V_c$ read in the open phase $F_c$ by zero; and when the upper driving switches are being driven, the induced voltage crossing $e_c$ by zero is equivalent to the voltage crossing $V_c$ read in the open phase $F_c$ by $V_{bar}$, as it can be observed in FIGS. 8, 9 and 10.

In the case of rheostatic braking with pulse width modulation, when one of the switches is open, we have the following situation:

$e_c = v_c - V_{bar}/2$, when a phase $F_a$ or $F_b$ is connected to the busbar and the other phase $F_a$ or $F_b$ is connected to the reference.

Therefore, it is possible to extract the information of the induced voltage $e_c$ in the third open phase $F_c$ from the voltage read $V_c$ in the third open phase $F_c$ and, thus, carry out the actions required.

In the case that phase voltage $V_c$ is monitored by means of a moving average type of digital filter, in order to extract the harmonics of the pulse width modulation, the obtention of the induced voltage $e_c$ can be easily carried out through the compensation of the voltage read $V_c$ in function of the duty cycle dc and the busbar voltage $V_{bar}$.

For example, it is the case of associating the rheostatic braking with pulse width modulation, where $t_{on}$ is the time wherein the two switches are driven at a certain electric position for short-circuiting the rheostatic braking, $t_{off}$ is the time wherein one of the switches is open by the pulse width modulation and $T_{PWM}$ is the complete period of a pulse width modulation cycle composed by $t_{on} + t_{off}$.

In this case, the induced voltage $e_c$ at the third open phase $F_c$ can be extracted by means of the average in a modulation period as below:

$$e_c = \frac{1}{T_{PWM}} \cdot \left( \int_0^{t_{on}} v_c dt + \int_{T_{PWM}-t_{off}}^{T_{PWM}} \left(v_c - \frac{V_{bar}}{2}\right) dt \right)$$

$$e_c = \frac{1}{T_{PWM}} \cdot \left( \int_0^{T_{PWM}} v_c dt - \int_0^{t_{off}} \frac{V_{bar}}{2} dt \right)$$

$$e_c = v_c - \frac{t_{off}}{T_{PWM}} \cdot \frac{V_{bar}}{2}$$

In other words, the induced voltage $e_c$ at the third open phase $F_c$ could be deducted from the measured voltage $V_c$ of the open phase $F_c$, of the complementary duty cycle $\overline{dc}$, and of the busbar voltage $V_{bar}$, according to the equation below:

$$e_c = v_c - \overline{dc} \cdot \frac{V_{bar}}{2}$$

In practice, the average voltage of the open phase $V_c$ is obtained by means of reading the voltage $V_c$ through the moving average type of digital filter, the complementary duty cycle $\overline{dc}$ is obtained from the duty cycle dc applied at the braking, and $V_{bar}$ from a voltage sensor connected to the busbar.

[Removal of Disturbance in the Induced Voltage at the Third Open Phase]

Another important point during monitoring of the induced voltage $e_c$ at the third open phase $F_c$ consists of respecting the extinction of the residual current which circulated at this phase before its opening. During the extinction of the residual current, it is not possible to monitor the induced voltage $e_c$ at the third open phase $F_c$, but it is possible to detect the occurrence of such current.

When a phase is open, a peak voltage at the monitored phase voltage occurs, such voltage is equal to the busbar voltage $V_{bar}$ when the undesired current is leaving the phase at the moment of opening the driving switch or is equal to zero when the undesired current is entering the phase at the moment of opening the driving switch. Therefore, it is possible to prevent such disturbance at the induced voltage monitoring such peak voltage until their extinction, or simply waiting for a minimum time for their extinction, such as it was done in the techniques for driving BLDC motors 10 of the prior art.

In addition to the embodiments previously presented, the same inventive concept can be applied to other alternatives or possibilities of using the invention. For example, in air compressors and starter motors in vehicles.

Though this invention has been described in relation to certain preferred embodiments, it should be understood that there is no intention of limiting the invention to such particular embodiments. On the contrary, the intention is to embrace all the alternatives, modifications, and equivalencies possible within the spirit and scope of the invention, as defined by the annexed claims.

The invention claimed is:

1. Rheostatic braking method, applied in a BLDC motor (10) used in hermeticos compressors, characterized in that comprises:
   selecting a first phase and a second phase, connected to the BLDC motor (10), which will be short-circuited, at a certain electric position of the BLDC motor (10), wherein the first phase and the second phase selected are the phases having the major induced voltage and the minor induced voltage at a certain electric position of the BLDC motor (10);
   maintaining a third open phase to monitor the electric position of the BLDC motor (10) by means of monitoring the induced voltage at this third open phase; and
   separating the rheostatic braking in six electric positions, each electric position being associated to two electric sections: a first section before zero crossing of the induced voltage of the third open phase; and a second section after the zero crossing.

2. Method, according to claim 1, characterized in that when the induced voltage at the third open phase is positive, the short-circuit is carried out through the lower switches of the first phase and second phase, and when the induced voltage at the third open phase is negative, the short-circuit is carried out through the upper switches of the first phase and second phase.

3. Method, according to claim 2, characterized in that the change of the first section to second section, at each electric position, is carried out through the monitoring of the induced voltage at the third open phase and at the moment of the zero crossing of the induced voltage at the third open phase.

4. Method, according to claim 3, characterized in that it comprises replicating the same driving configuration of the switches of the first section in the second section, applying the same driving configuration at the switches during all the electric position.

5. Method, according to claim 4, characterized in that the next electric position is anticipated in 30° electrical, wherein the change of position is done soon after the detection of the zero crossing of the induced voltage at the third open phase, preventing the occurrence of an undesired current during all the electric position and allowing more time for extinguishing the residual current after a change of position.

6. Method, according to claim 3, characterized in that the change of position is done after a waiting time, wherein such waiting time is equal to the time measured between the last change of position and the detection of the zero crossing.

7. Method, according to claim 1, characterized in that a pulse width modulation, with a certain duty cycle (dc), is applied on one of the switches, wherein the switch selected is that, when open, causes the current to circulate through the busbar.

8. Method, according to claim 7, characterized in that the control of the duty cycle (dc) of the pulse width modulation is done in function of the desired braking current ($I_{des}$), of the equivalent resistance ($R_{eq}$) between two phases, of the busbar voltage ($V_{cc}$) and of the estimated induced voltage ($E_m$).

9. Method, according to claim 8, characterized in that the desired braking current ($I_{des}$) is equal or less than the limit of the maximum current of the BLDC motor (10).

10. Method, according to claim 7, characterized in that the duty cycle (dc) begins with an initial minimum value and increases at a determined increment rate until the duty cycle (dc) is equal to 100%.

11. Method, according to claim 1, characterized in that the induced voltage at the third open phase is obtained by means of an average voltage read at the third open phase and compensated by subtracting the busbar voltage ($V_{bar}$) over twice the complementary duty cycle ($\overline{dc}$).

12. Method, according to claim 11, characterized in that the average voltage read at the third open phase is obtained by means of processing the voltage read at said third open phase by means of a moving average digital filter.

13. Method, according to claim 12, characterized in that the moving average digital filter is carried out by a multiple sampling frequency of the switching frequency of the pulse width modulation and the number of samples equal to the relation between the sampling frequency of the filter and the switching frequency.

14. Method, according to claim 12, characterized in that the occurrence of the residual current is detected by analyzing the voltage of the third open phase, being equal to the busbar voltage ($V_{bar}$) when the current at the third open phase is leaving and equal to zero when the current at the third open phase is entering.

15. Method, according to claim 1, characterized in that the monitoring of the voltage at the third open phase is conducted only after the extinction of the residual current of said third open phase or after a minimum time.

* * * * *